US008054158B2

(12) United States Patent
Nakashima

(10) Patent No.: US 8,054,158 B2
(45) Date of Patent: Nov. 8, 2011

(54) ON-VEHICLE EQUIPMENT CONTROL SYSTEM

(75) Inventor: Kazuhiro Nakashima, Obu (JP)

(73) Assignee: Denso Corporation, Kariya (JP)

( * ) Notice: Subject to any disclaimer, the term of this patent is extended or adjusted under 35 U.S.C. 154(b) by 1091 days.

(21) Appl. No.: 11/604,219

(22) Filed: Nov. 27, 2006

(65) Prior Publication Data

US 2007/0120645 A1 May 31, 2007

(30) Foreign Application Priority Data

Nov. 25, 2005 (JP) ................................ 2005-340768

(51) Int. Cl.
*G05B 19/00* (2006.01)
*B60R 25/00* (2006.01)

(52) U.S. Cl. ...................................... 340/5.61; 340/5.72

(58) Field of Classification Search .................. 340/825, 340/5.1, 5.2, 5.6, 5.61, 5.62, 5.63, 5.64, 5.72, 340/5.7, 426.2, 426.24, 426.1, 425.5, 426.35, 340/426.13, 430, 500, 501, 527, 528, 426.16, 340/426.17; 307/10.1–10.5
See application file for complete search history.

(56) References Cited

U.S. PATENT DOCUMENTS 4,670,746 A * 6/1987 Taniguchi et al. ........... 340/5.62
5,684,454 A * 11/1997 Nishioka et al. ......... 340/426.12
5,912,631 A * 6/1999 Kusunoki ..................... 340/5.64
6,522,027 B1 * 2/2003 Morillon et al. ............. 307/10.3
6,552,649 B1 * 4/2003 Okada et al. ................. 340/5.61
6,580,181 B2 * 6/2003 Nagoya et al. ............... 307/10.5
6,798,337 B2 * 9/2004 Onuma et al. ............... 340/5.72
6,801,120 B2 * 10/2004 Hara ........................... 340/5.72
6,850,148 B2 * 2/2005 Masudaya .................... 340/5.61
7,002,449 B2 * 2/2006 Sugawara .................... 340/5.61
7,193,334 B2 * 3/2007 Hiramitsu et al. ........... 307/10.1
7,580,809 B2 * 8/2009 Takeuchi ...................... 702/153
2003/0058086 A1 * 3/2003 Hara .......................... 340/425.5
2004/0104804 A1 * 6/2004 Sugawara .................... 340/5.61
2004/0107031 A1 * 6/2004 Ichikawa et al. ................ 701/36
2005/0253684 A1 * 11/2005 Kumazaki et al. ........... 340/5.62
(Continued)

FOREIGN PATENT DOCUMENTS

DE 19924081 11/2000
(Continued)

OTHER PUBLICATIONS

German Official Action dated Apr. 29, 2008 issued in corresponding German Appln. No. 10 2006 053 964.8 with English translation.

(Continued)

*Primary Examiner* — Brian Zimmerman
*Assistant Examiner* — An Nguyen
(74) *Attorney, Agent, or Firm* — Nixon & Vanderhye P.C.

(57) ABSTRACT

When vehicle doors have been opened and closed, request signals are transmitted from external transmitters and an internal transmitter to perform mutual communication with a portable device. At this time, when matching of an ID code of the portable device is OK, this matching result is stored. In mutual communication of one of when the vehicle doors are opened and closed, and when door lock switches are operated, if matching of the ID code is OK, the vehicle doors are automatically locked. In this way, by increasing chances of mutual communication between a vehicle unit and the portable device, it becomes more likely that the vehicle doors can be locked.

13 Claims, 7 Drawing Sheets

U.S. PATENT DOCUMENTS

| | | | | |
|---|---|---|---|---|
| 2007/0120645 | A1 * | 5/2007 | Nakashima | 340/5.61 |
| 2009/0058597 | A1 * | 3/2009 | Shibagaki et al. | 340/5.72 |
| 2009/0132836 | A1 * | 5/2009 | Mera et al. | 713/310 |

FOREIGN PATENT DOCUMENTS

| | | |
|---|---|---|
| DE | 19941849 | 4/2001 |
| DE | 60009637 | 4/2005 |
| JP | 10-59131 | 3/1998 |
| JP | 2000-104429 | 4/2000 |
| JP | A-2001-349110 | 12/2001 |
| JP | A-2002-81248 | 3/2002 |
| JP | A-2004-42716 | 2/2004 |
| JP | 2005-220729 | 8/2005 |

OTHER PUBLICATIONS

Office Action dated Jun. 3, 2010 issued in corresponding Japanese Application No. 2005-340768 with an at least partial English-language translation thereof.

* cited by examiner

ON-VEHICLE EQUIPMENT CONTROL SYSTEM

CROSS REFERENCE TO RELATED APPLICATION

This application is based on and incorporates herein by reference Japanese Patent Application No. 2005-340768 filed on Nov. 25, 2005.

FIELD OF THE INVENTION

The present invention relates to on-vehicle equipment control system that control on-vehicle equipment based on a result of mutual communication between a portable device and a vehicle unit.

BACKGROUND OF THE INVENTION

JP-10-59131A proposes an on-vehicle equipment control system. In this system, when a switch provided in a door knob of a vehicle door has been operated, mutual communication is performed between a vehicle unit (main device) and a portable device. When a normal response signal has been received from the portable device, the vehicle door is locked by a door lock/unlock device, which is on-vehicle equipment.

In this system, a low-power request signal and a high-power request signal are transmitted from the vehicle unit to prevent the portable device from being carelessly left in a vehicle compartment when a door is locked. Specifically, a range in which the low-power request signal can be received by the portable device is set to be almost the same as the interior of the vehicle compartment. Therefore, when a response to the low-power request signal is returned thereby confirming reception of the low-power request signal, it can be determined that the portable device has been left in the vehicle compartment.

When no response has been received in response to the low-power signal, a high-power request signal is transmitted to determine whether the portable device transmits a response signal to the high-power request signal. A range in which the high-power request signal can be received is set to include a predetermined range in the outside vicinity of the vehicle. Therefore, when a response is made from the portable device in response to the high-power request signal, the vehicle unit determines that a user carrying the portable device is outside the vehicle, and automatically locks the doors.

When the mutual communication between the vehicle unit and the portable device is performed because the switch provided in the door knob has been operated, the user carrying the portable device is in many cases in the vicinity of the vehicle door to operate the switch.

In this case, for example, the mutual communication between the vehicle unit and the portable unit may be disabled depending on the positional relation with a transmitter or receiver of the vehicle unit and the portable device, for example, when a vehicle body or human body through which radio waves do not easily pass exists between the vehicle unit and the portable device, the mutual communication may be disabled. That is, even within an area in which the mutual communication with the vehicle unit is to be performed, a dead zone area in which the mutual communication is disabled may arise.

When the portable device carried by the user who operates the switch enters and stops in the dead zone area while carrying the portable device, the portable device also remains in the dead zone area. As a result, the user cannot lock the door despite carrying the portable device.

Some of on-vehicle equipment control systems target a vehicle engine for control, and permit and prohibit engine startup based on a result of mutual communication between a vehicle unit and a portable device. In this system, while the portable device is brought into a vehicle compartment by the user, when the storage position of the portable device 1 enters the above dead zone area, the user might not be able to start up the engine despite operating an engine switch.

SUMMARY OF THE INVENTION

The present therefore an object to provide on-vehicle equipment control system, that enables necessary control for on-vehicle equipment in spite of a dead zone between a vehicle unit and a portable device.

According to one aspect of the present invention, an on-vehicle equipment control system comprises a portable device carried by a user and a vehicle unit. The vehicle unit transmits a request signal from a vehicle for performing mutual communication with the portable device, receives a response signal of the portable device, matches the ID code included in the response signal with a stored ID code, and controls on-vehicle equipment in response to matching-OK indicating that the ID codes are in a predetermined relation. The vehicle unit includes a control unit that causes an external transmitter to transmit the request signal when the vehicle door is opened and closed, stores the matching-OK as a result of matching the response signal received from the portable device and the request signal of the external transmitter, and controls locking of the vehicle door when the trigger switch is operated. The control unit locks the door when the matching-OK is stored, and locks the door after causing the external transmitter to transmit the request signal when no matching-OK is stored and confirming newly the matching-OK.

According to another aspect of the present invention, the control unit permits a startup of an engine when a matching-OK is stored in the memory as a result of communication by an internal transmitter, and permits the startup of the engine after causing the internal transmitter to transmit the request signal when no matching-OK is stored in the memory and confirming newly the matching-OK.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

First Embodiment

Figure 1:
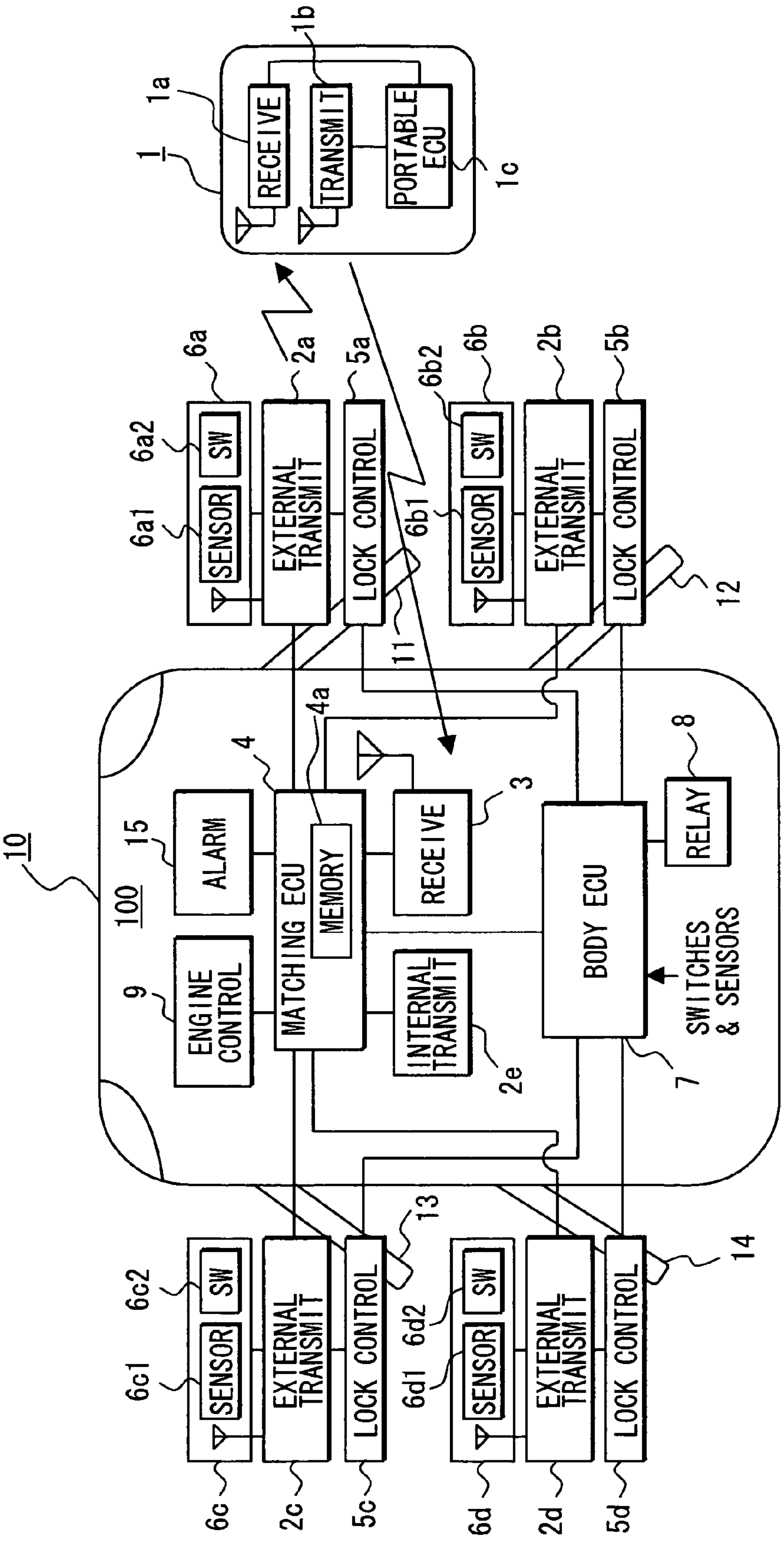
FIG. 1 is a block diagram showing an on-vehicle equipment control system in a first embodiment of the present invention.

Referring to FIG. 1, an on-vehicle equipment system includes a portable device 1 carried by a user and a vehicle unit 100 mounted on a vehicle 10, and controls lock/unlock states of respective doors based on a result of ID code matching check operations by mutual communication between the portable device 1 and the vehicle unit 100. To increase security of the vehicle 10, the vehicle unit 100 controls permission or prohibition of engine startup of the vehicle 10 based on the matching result of ID codes.

As shown in FIG. 1, the portable device 1 includes a receiver 1*a* that receives a request signal from external transmitters 2*a*-2*d* or an internal transmitter 2*e* of the vehicle unit 100, and a transmitter 1*b* that transmits a response signal including an ID code specific to the portable device 1 (or the vehicle 10) and the like in response to the reception of the request signal. A portable device ECU 1*c* is connected with the receiver 1*a* and the transmitter 1*b* to perform various control processing. Specifically, the portable device ECU 1*c* determines the presence of the reception of the request signal based on the receive signal of the receiver 1*a*, creates a response signal including the ID code and the like in response to the reception of the request signal, and transmits it from the transmitter 1*b*.

The vehicle unit 100 includes external transmitters 2*a*-2*d* provided in the respective doors 11-14 in the vehicle 10, and an internal transmitter 2*e* provided in a vehicle compartment. These external transmitters 2*a*-2*d* and the internal transmitter 2*e* transmit request signals according to transmission command signals from a matching ECU 4 of the vehicle unit 100. The matching ECU 4 has a memory 4*a*.

Figure 2:
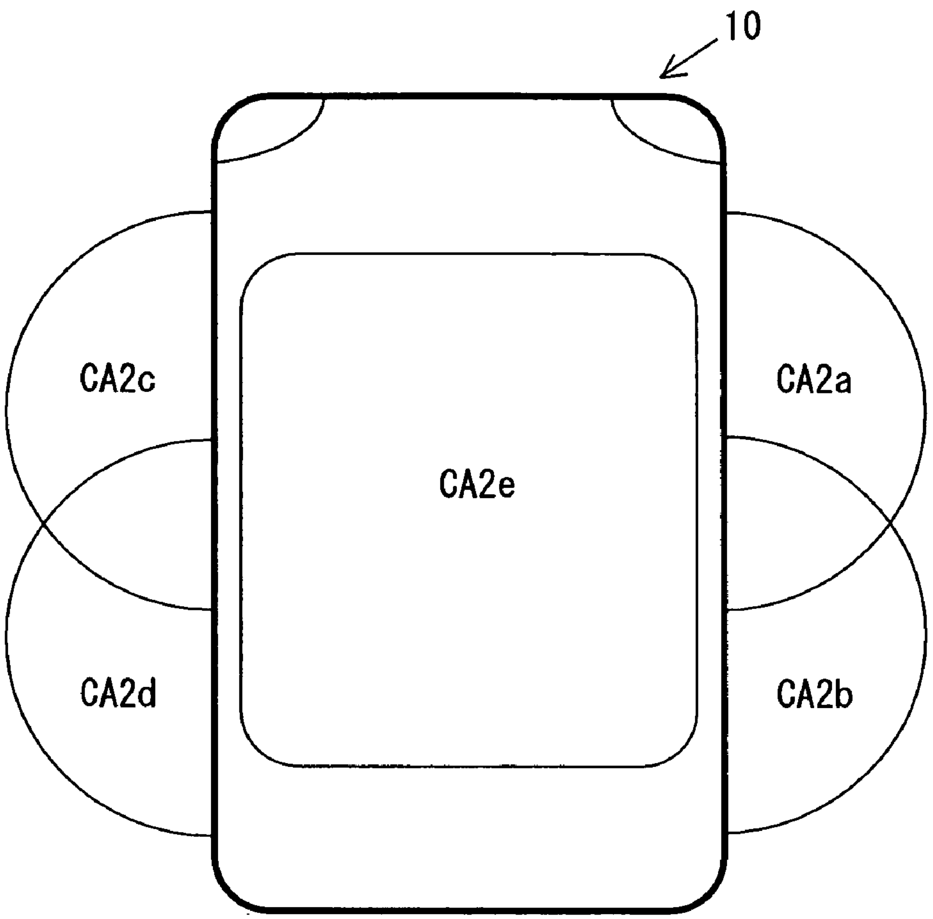
FIG. 2 is a schematic view showing communication areas of external transmitters and an internal transmitter in the first embodiment.

Reach distances of request signals of the external transmitters 2*a*-2*d* are respectively set to about 0.7 to 1.0 m around the doors 11-14 to define communication areas CA2*a*-CA2*d* and CA2*e* as shown in FIG. 2. During parking of the vehicle 10, periodically, according to reach distances of request signals, communication areas with the portable device 1 are formed on the periphery of the respective doors 11 to 14 of the vehicle so that it can be detected that the user of the portable device 1 approaches the vehicle 10. A communication area with the portable device 1 by the internal transmitter 2*e* is formed to cover the vehicle compartment during startup of the engine or when the doors are locked, to detect whether the portable device 1 is in the vehicle compartment. The internal transmitter 2*e* may be an internal transmitter for front seats that has a communication area mainly covering the front seats, and an internal transmitter for rear seats that has a communication area mainly covering the rear seats. In this case, a combined communication area of a combination of the internal transmitter for the front seats and the internal transmitter for the rear seats covers the whole vehicle compartment.

The vehicle unit 100 is provided in the vehicle compartment of the vehicle 10, and has a receiver 3 that receives a response signal synchronously with the output of a transmission command signal to the transmitters 2*a*-2*e* and receives a response signal sent from the portable device 1. The response signal received by the receiver 3 is outputted to the matching ECU 4. The matching ECU 4 checks whether a predetermined relation is satisfied between ID codes. For example, it determines whether an ID code included in the received response signal matches a predetermined ID code stored in the ECU 4. The matching ECU 4 determines as matching-OK (YES) when the ID code and the stored ID code are in a predetermined relation, and determines as matching NG (NO) when the predetermined relation is not satisfied. The matching ECU 4, according to whether the matching is OK or NG, locks or unlocks the doors by way of a body ECU 7 and permits or prohibits engine startup by way of an engine control device. The ID code stored in the matching ECU 4 may vary among the doors 11 to 14 or the transmitters.

The body ECU 7 supplies or stops electric power to equipment mounted in the vehicle, and outputs drive signals for controlling lock/unlock of the vehicle doors 11 to 14 to lock control devices 5*a* to 5*d* provided in the respective doors. The body ECU 7 is supplied with signals from respective sensors and switches to determine whether a condition for starting up the engine is satisfied. Specifically, the body ECU 7 is provided near a driver seat, and is supplied with signals of an engine switch operated by the user to command startup or stop of the engine, a vehicle speed sensor that detects a running speed of the vehicle, a shift position sensor that detects a shift position of a transmission, a stop lamp switch that outputs an ON signal when a brake pedal is operated by the driver, and a door courtesy lamp switch for detecting door open/close.

The body ECU 7 determines that a condition for starting up the engine has been satisfied when the engine switch is operated with a brake pedal being pressed down, a shift position being in a parking position, and the speed of the vehicle being zero. In this case, the body ECU 7 drives a relay circuit 8, and supplies the electric power to equipment mounted in the vehicle from a battery (not shown) via the relay circuit 8.

The vehicle unit 100 further includes lock control devices 5*a* to 5*d* that are respectively provided in the doors 11-14 of the vehicle 10 to lock and unlock the doors 11 to 14. Specifically, the lock control devices 5*a*-5*d* include door lock motors that rotate forwardly or reversely according to lock signal/unlock signals transmitted from the body ECU 7, and the respective vehicle doors 11-14 are locked or unlocked by the rotation of the door lock motors.

Door handles 6*a*-6*d* of the respective doors 11-14 of the vehicle 10 are provided with touch sensors 6*al*-6*d*1 to detect that the user of the portable device 1 has touched the door handles 6*a*-6*d* to operate them. The door handles 6*a*-6*d* are also provided with door lock switches 6*a*2-6*d*2 constructed as push switches. The doors 11-14 can be locked by operating the door lock switches 6*a*2-6*d*2. The door handles 6*a*-6*d* also serve as antennas of the external transmitters 2*a*-2*d*.

To detect operations on the vehicle doors 11-14 by the user of the portable device 1, without relying on the touch sensors 6*a*1-6*d*1, for example, a detection mechanism or the like may be used to mechanically detect that the door handle 6*a*-6*d* have been forwardly pulled. Alternatively, the door handles 6*a*-6*d* may be provided with unlock buttons to detect operations on the vehicle doors 11-14 from operations on the unlock buttons. Only either of the touch sensors 6*a*1-6*d*1 and the door lock switches 6*a*2-6*d*2 may be provided in the vehicle doors 11-14 to be shared as operation parts for unlocking and operation parts for locking.

To enhance the security of the vehicle, this embodiment controls the permission or prohibition of engine startup according to whether the matching of ID codes is OK or NG when the engine switch is operated. Specifically, the matching ECU 4 in the vehicle unit 100, connected to the engine control device 9 that controls the operating state of the engine, outputs a control signal that commands the permission or prohibition of engine startup according to a matching result of ID codes. The matching ECU 4, when door lock control is executed, commands the engine control device 9 to bring the engine into a startup prohibition state.

Furthermore, the vehicle unit 100 has an alarm device 15. The alarm device 15 notifies leaving the portable device 1 in the vehicle compartment when the vehicle doors 11-14 are locked, or notifies that the portable device 1 is not found in any of the inside and outside of the vehicle compartment. Specifically, the vehicle unit 100, when the vehicle doors 11 to 14 are locked, transmits request signals from the external transmitters 2*a*-2*d* and the internal transmitter 2*e*. In this case, when a response signal is received from the portable device 1 in response to the request signal from the internal transmitter 2*e*, since the portable device 1 may be left in the vehicle compartment, an alarm is issued by the alarm device 15. When a response signal from the portable device 1 is not received in response to transmission of request signals from the external transmitters 2*a*-2*d* and the internal transmitter 2*e*, since the portable device 1 may not be in any of communication areas inside and outside the vehicle compartment, the alarm device 15 notifies that the portable device 1 is not found within the communication areas. Notification or alarm by the alarm device 15 may be made by voice, a buzzer, and irradiation and the like.

Unlock control of the respective doors 11-14 is performed in this embodiment is attained in the following manner.

When the engine of vehicle 10 is stopped and the vehicle 10 is parked with the doors 11-14 locked, the matching ECU 4 commands the external transmitter 2*a*-2*d* to transmit request signals each time a predetermined time elapses, to determine whether the user of the portable device 1 is near the vehicle 10.

In this case, from the external transmitter 2*a*-2*d*, request signals including ID codes unique to each of the external transmitters 2*a*-2*d* are transmitted, and the portable device 1 is constructed to send back a response signal including the ID code. This enables identification of any of the vehicle doors 11 to 14 that the user of portable device 1 approaches. To identify the position of any of the vehicle doors 11-14 that the user of the portable device 1 approaches, the matching ECU 4 may command the transmitters 2*a*-2*d* to sequentially transmit the requests with a time delay.

When the portable device 1 sends back a response signal in response to the request signal of any of the external transmitters 2*a*-2*d*, the response signal is received by the receiver 3 of the vehicle unit 100. The matching ECU 4 checks matching an ID code included in the response signal to determine whether a predetermined relation is satisfied, such as whether the ID code matches an ID code stored in advance.

When it is determined in the matching ECU 4 that the matching of the ID code is OK, the matching ECU 4 determines the position of the user of the portable device 1 from the ID code included in the response signal. By activating a touch sensor 6*a*1-6*d*1 of the vehicle door 11-14 corresponding to the position, the matching ECU 4 commands the body ECU 7 to bring the vehicle door 11-14 into an unlock stand-by state. According to the command signal, the body ECU 7 brings any of the vehicle doors 11-14 into an unlock stand-by state.

When the user of the portable device 1 touches the door handle 6*a*-6*d* of the vehicle door 11-14 put in the unlock stand-by state, the door handle operation of the user of the portable device 1 is detected by the touch sensor 6*a*1-6*d*1, and the detected signal is transmitted to the matching ECU 4. The matching ECU 4 commands the body ECU 9 to unlock all vehicle doors 11-14. According to the command signal, the body ECU 9 outputs unlock drive signals to the lock control devices 5*a*-5*d* of the vehicle doors 11-14 to unlock the vehicle doors 11-14.

This embodiment also performs lock control for the doors 11 to 14 and engine startup control in the following manner.

In this embodiment, when the door lock switches 6*a*2-6*d*2 provided in the door handles 6*a*-6*d* are operated, the operation triggers lock control devices 5*a* to 5*d* to lock the doors 11-14 based on a matching result of ID codes by mutual communication between the transmitters 2*a*-2*e* and the portable device 1.

In this case, only when the door lock switches are operated, if mutual communication with the portable device 1 is performed using the external transmitters 2*a*-2*d* and the receiver 3, the mutual communication may be disabled depending on the positional relation with the external transmitters 2*a*-2*d* or the receiver 3 and the portable device 1. For example, when the vehicle body, human body, or the like through which radio waves do not easily pass exist between the external transmitters 2*a*-2*d* or the receiver 3 and the portable device 1, mutual communication may be disabled. Thus, even when the portable device 1 is within the communication areas CA2*a* to CA2*d* of the external transmitters 2*a*-2*d* shown in FIG. 2, a dead zone area in which the mutual communication is disabled may occur.

When the portable device 1 carried by the user enters the dead zone area, since the user stops moving to operate the door lock switches 6*a*2-6*d*2, the portable device 1 also remains in the dead zone area. As a result, although the user carries the portable device 1, the user cannot automatically lock the vehicle doors 11-14.

Therefore, in this embodiment, when the vehicle doors 11-14 are opened and closed, the request signals are transmitted from the external transmitters 2*a*-2*d* and the internal transmitter 2*e* in the vehicle unit 100 to perform mutual communication with the portable device 1. Specifically, before the door lock switches 6*a*2-6*d*2 that command the lock of the vehicle doors 11-14 are operated, mutual communication with the portable device 1 is performed using the external transmitters 2*a*-2*d* and the internal transmitter 2*e*.

When the vehicle doors 11-14 are opened and closed, the user is expected to get in the vehicle or get off the vehicle. When the user has gotten off the vehicle, after that, within a relatively short time, the door lock switches 6*a*2-6*d*2 will be probably operated. Therefore, when the vehicle doors 11-14 are opened and closed, by performing mutual communication between the vehicle unit 100 and the portable device 1, a matching result of ID codes usable to determine whether to perform door lock control can be obtained. Specifically, when OK is obtained as a result of ID code matching when the door is opened and closed, the matching result is stored. In mutual communication when the vehicle doors are opened and closed, and when the door lock switches 6*a*2-6*d*2 are operated, if ID code matching is OK, the vehicle doors are locked.

Thus, by increasing chances of mutual communication between the vehicle unit 100 and the portable device 1, the occurrence of situations can be minimized in which the vehicle doors 11 to 14 cannot be locked for the reason that mutual communication between the vehicle unit 100 and the portable device 1 is disabled.

Figure 3:
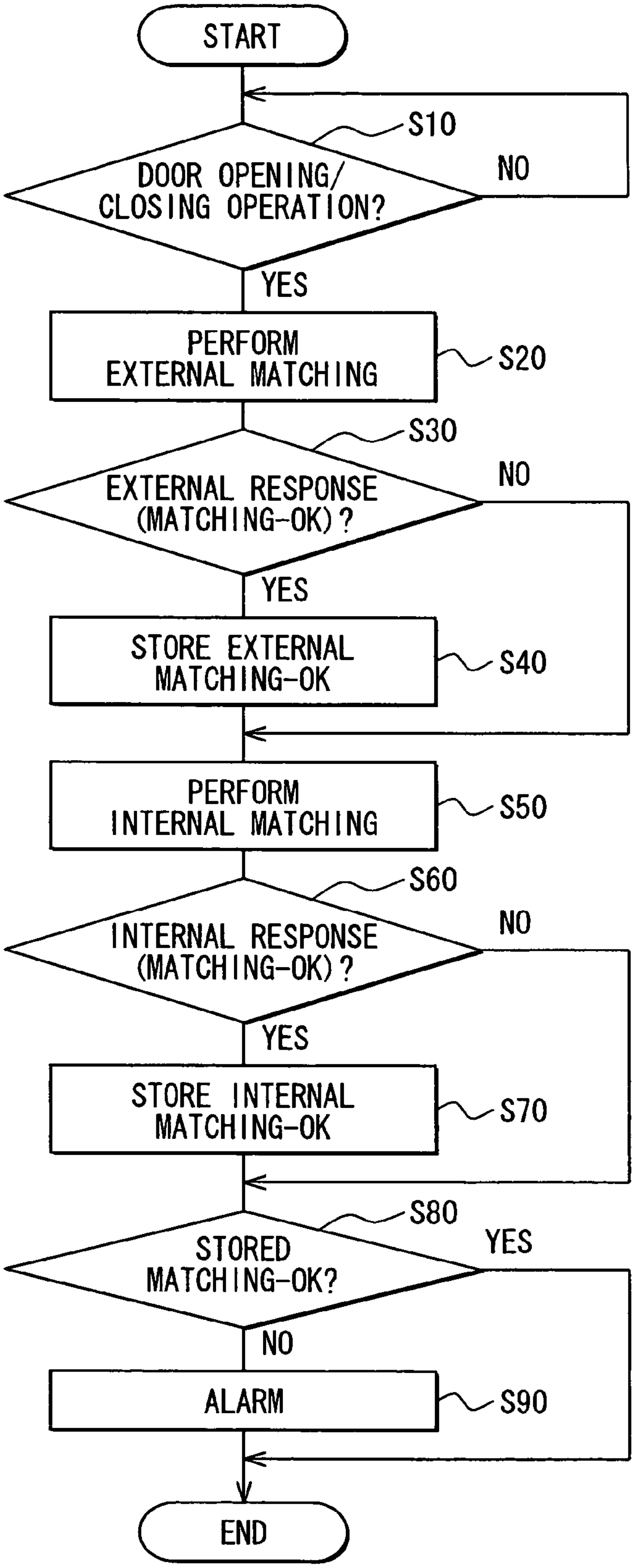
FIG. 3 is a flowchart showing door open/close time mutual communication processing in the first embodiment.

The matching ECU 4 performs the door open/close time mutual communication processing as shown in FIG. 3 with the portable device 1 through transmission of request signals from the external transmitters 2*a*-2*d* and the internal transmitter 2*e* of the vehicle unit 100 when the vehicle doors 11-14 are opened and closed. Whether the vehicle doors 11-14 are opened and closed can be detected by the door courtesy lamp switches. This processing may be performed in any time point of opening of the vehicle doors 11-14 or closing of the vehicle doors 11-14.

Step S10 determines whether any of vehicle doors 11-14 has been opened and closed. Only when it is determined by this determination processing that the vehicle door 11-14 has been opened and closed, processing in and after step S20 is executed. Therefore, only when it is necessary to determine whether to lock the vehicle door 11-14, mutual communication with the portable device 1 can be performed using the external transmitters 2*a*-2*d* and the internal transmitter 2*e* in processing in and after step S20. As a result, consumption of electric power can be reduced any of the vehicle unit 100 and the portable device 1.

Step S20 transmits a request signal from the external transmitters 2*a*-2*d* to perform external (out-of-vehicle-compartment) matching. Step S30 determines whether a response of ID code, which results in matching-OK, has been received in the receiver 3 from the portable device 1, which is in the external side. When the determination at step S30 is YES, step S40 stores in the memory 4*a* a matching result indicating that the external matching is OK.

Step S50 transmits a request signal from the internal transmitter 2*e* to execute internal (in-vehicle-compartment) matching. Step S60 determines whether a response of ID code, which results in matching-OK, has been received in the receiver 3 from the portable device 1, which is in the internal side. When the determination in the Step S60 is YES, step S70 stores in the memory 4*a* a matching result indicating that the internal matching is OK.

Step S80 determines whether a result of matching-OK for at least one of external matching and internal matching is stored. When the vehicle door 11-14 has been opened and closed, if the portable device 1 is within the vehicle compartment or outside the vehicle compartment and in the neighborhood of the vehicle, it is very rare that a response signal from the portable device 1 cannot be received for request signals from both the external transmitters 2*a*-2*d* and the internal transmitter 2*e*. Therefore, when a result of matching-OK for any of external matching and internal matching is not stored at step S80, step S90 alarms that the portable device 1 cannot be found inside and outside the vehicle.

To prevent failure in the alarm, when a response signal from the portable device 1 is not received despite plural requests from the external transmitters 2*a*-2*d* and the internal transmitter 2*e*, an alarm may be issued.

By the above door open/close time mutual communication processing, when any door is opened and closed, when the matching of an ID code is OK as a result of mutual communication between the external transmitters 2*a*-2*d* and/or the internal transmitter 2*e* and the portable device 1, the matching result may be stored.

Figure 4:
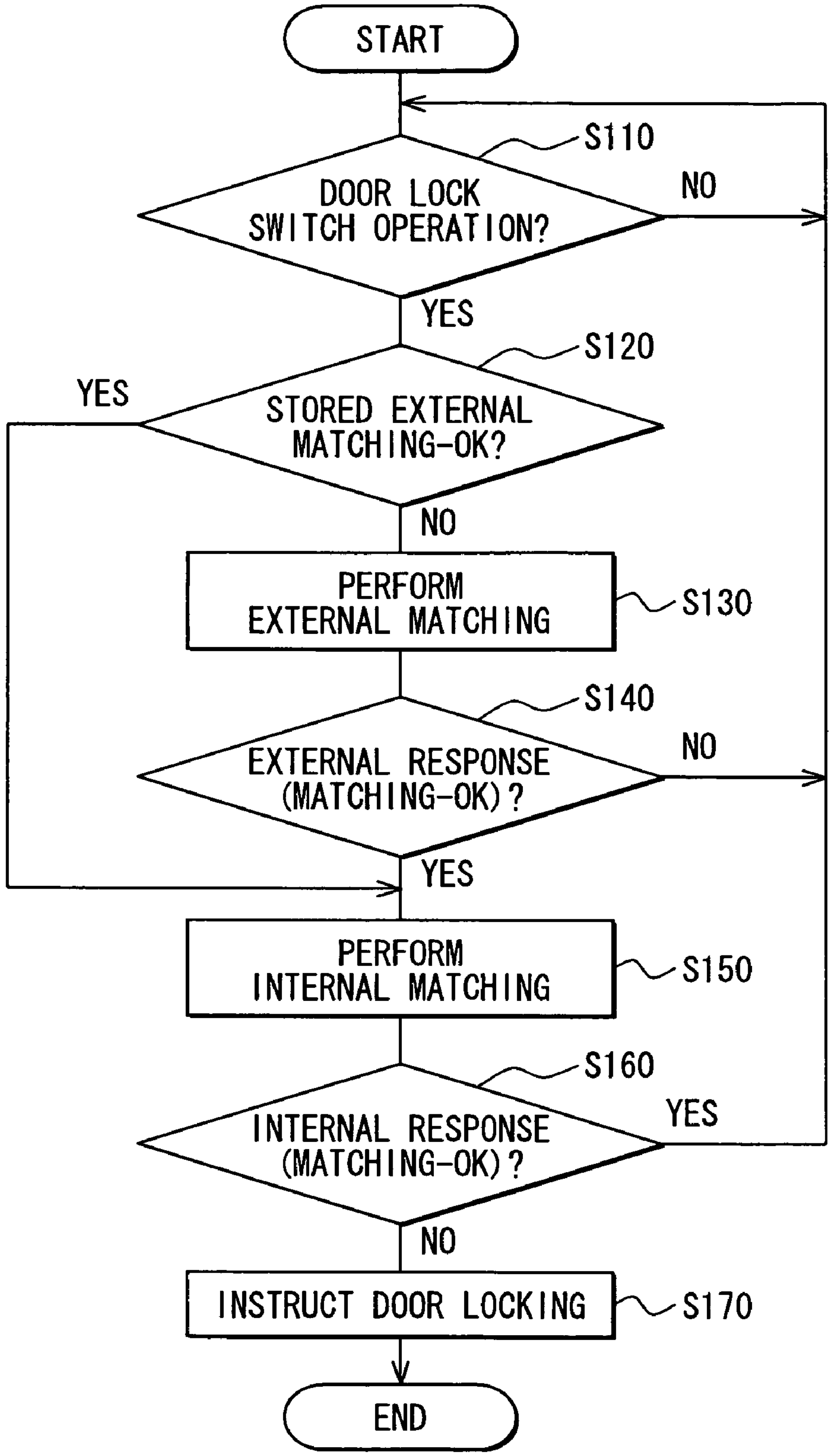
FIG. 4 is a flowchart showing door lock control in the first embodiment.

The matching ECU 4 further performs door lock control as shown in FIG. 4. Step S110 determines whether any door lock switch 6*a*2-6*d*2 has been operated by the user after opening and closing the door for, for instance, getting off the vehicle. When it is determined in the determination processing that the door lock switch 6*a*2-6*d*2 has been operated, the processing proceeds to step S120.

Step S120 determines whether the matching result of external matching-OK has already been stored in the door open/close time mutual communication processing performed when the door is opened and closed to get off the vehicle. When it is determined in the determination processing that the matching result of external matching-OK is stored, the processing proceeds to step S150 without executing external processing at step S130 and step S140. Specifically, since the user of the portable device 1 can be regarded as having gotten off the vehicle while carrying the portable device 1 because mutual communication between the external transmitters 2*a*-2*d* and the portable device 1 has been performed when the door is opened and closed, the processing proceeds to the next step S150 without performing the external matching again.

At step 130 and step S140, the same processing as that in the above step S20 and step S30 is executed.

Step S150 transmits a request signal from the internal transmitter 2*e* to perform internal matching. Step S160 determines whether a response signal, which results in ID code matching-OK, is sent back from the portable device 1, in response to the transmission of the request signal at step S150. When "YES" is determined in the determination processing, the user may have left the portable device 1 in the vehicle compartment. Therefore, the processing returns to step S110 without locking the vehicle doors 11-14 at step S170. In this case, the alarm device 15 warns that the portable device 1 has been left in the compartment.

On the other hand, when it is determined at step S160 that the response, which results in ID code matching-OK, is not received at step S160, the processing proceeds to step S170. Step S170 instructs locking of the vehicle doors 11-14 by way of the body ECU 7 and the lock control devices 5*a*-5*d*, then terminating the processing.

According to the above processing, even if the external matching at steps S130 and S140 is unsuccessful (NO at S140) due to the portable device 1 being in the dead zone, the door locking can be attained if the external matching-OK has already been determined and stored at the time of door opening and closing operation, which is before the door lock switch operation.

Figure 5:
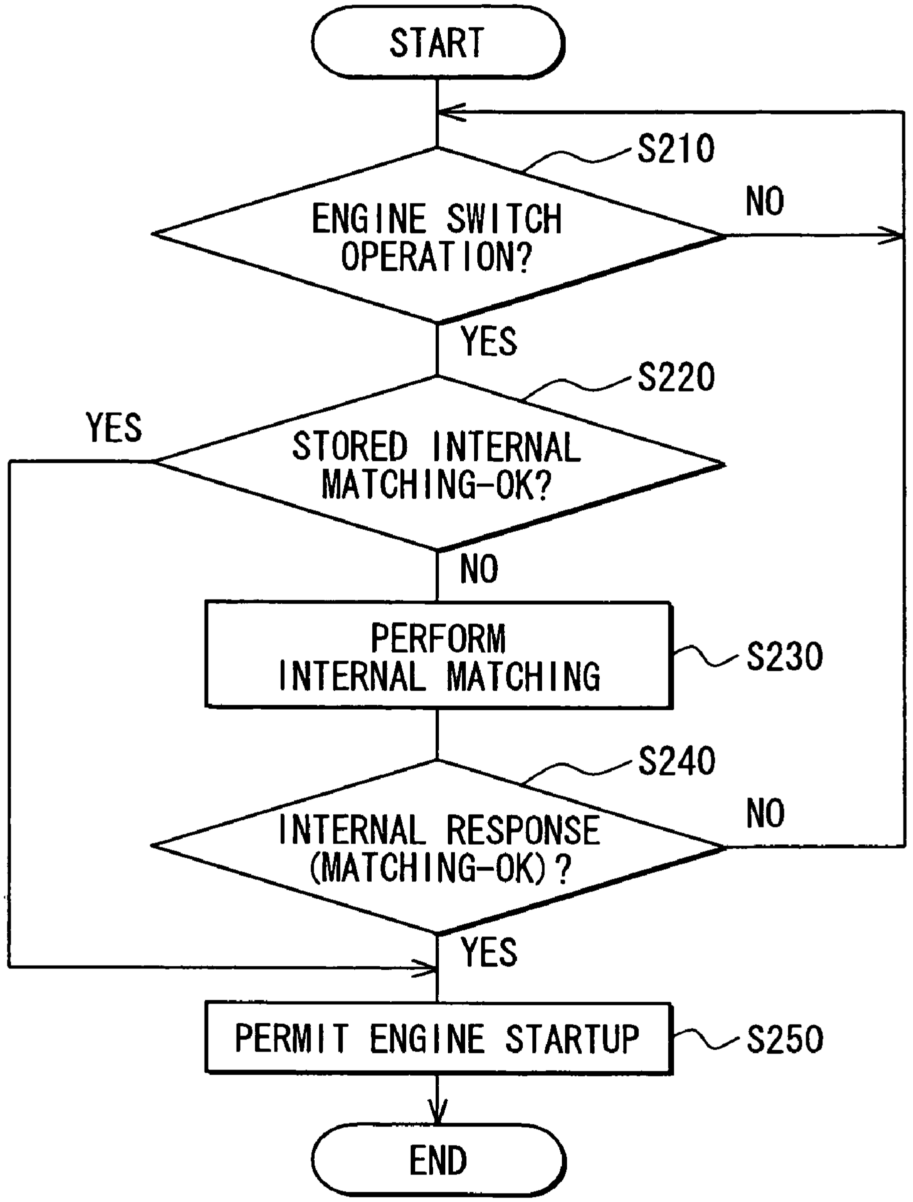
FIG. 5 is a flowchart showing engine startup control in the first embodiment.

The matching ECU 4 further performs engine startup control as shown in FIG. 5. Step S210 determines whether the engine switch has been operated. When it is determined in this determination processing that the engine switch has been operated, the processing proceeds to step S220.

Step S220 determines whether the matching result of internal matching-OK is stored in the door open/close time mutual communication processing. When it is determined in the determination processing that the matching result of internal matching-OK is stored, the processing proceeds to step S250 without executing the internal processing at step S230 and step S240. Specifically, the user of the portable device 1 can be regarded as having gotten in the vehicle while carrying the portable device 1 because mutual communication between the internal transmitters 2*a*-2*d* and the portable device 1 has been performed when the doors are opened and closed, the processing proceeds to the next processing without performing internal matching again.

At step 230 and step S240, the same processing as that in the above step S150 and step S160 is executed.

Step S250 outputs a permission signal to permit engine startup for the engine control device 9. As a result, the engine control device 9 can start up the engine and control its operating state.

By this engine startup control, while the portable device 1 is brought into the vehicle compartment by the user, even when the storage position of the portable device 1 enters a dead zone area in which communication with the vehicle unit 100 is disabled, the engine can be started up, based on the matching result of internal matching-OK when the doors are opened and closed. Therefore, it is less likely that the engine cannot be started up for the reason that mutual communication between the vehicle unit 100 and the portable device 1 is disabled.

Second Embodiment

An on-vehicle equipment control system in this second embodiment adds, to the on-vehicle equipment control system according to the first embodiment, various devices regarding mutual communication processing when the doors are opened and closed The door open/close time mutual communication processing in this embodiment will be described with reference to flowcharts of FIGS. 6 and 7.

Figure 6:
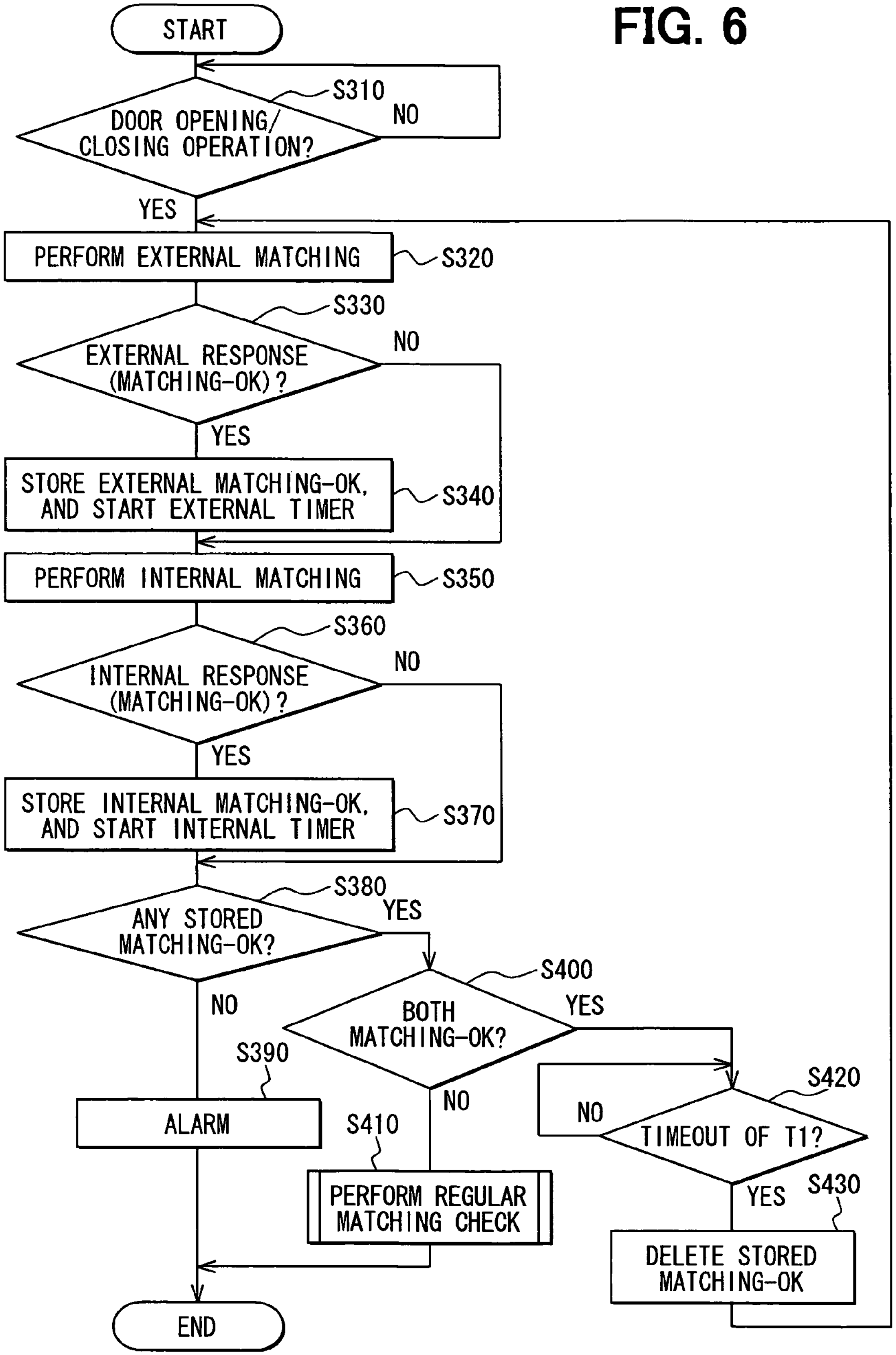
FIG. 6 is a flowchart showing door open/close time mutual communication processing in a second embodiment of the present invention.

Processing of steps S310 to S330 and steps S350 to S360 in FIG. 6 is the same as processing of steps S10 to S30 and steps S50 to S60 in FIG. 3. Step S340 stores in the memory 4*a* a matching result indicating that external matching is OK, and further starts a count operation of first timer that counts elapsed time from the storing the external matching-OK. Likewise, step S370 stores in the memory 4*a* a matching result indicating that internal matching is OK, and further starts a count operation of an internal timer that counts elapsed time from the storing the internal matching-OK.

Step S380 determines whether a result of matching-OK for at least one of external matching and internal matching is stored. When the result of matching-OK is stored, the processing proceeds to step S400. When any of the result of matching-OK is not stored, the processing proceeds to step S390 to give an alarm, as in the first embodiment.

Step S400 determines whether matching results indicating both the internal matching-OK and the external matching-OK are stored. In this case, when it is determined that the result of matching-OK is stored for both of internal and external matching, the processing proceeds to step S420 to determine whether a first predetermined time (period) T1 to store the matching result of matching-OK has expired (timeout), based on elapsed time counted by the external timer and/or the internal timer 2. When it is determined at step S420 that the first predetermined time T1 has expired, the processing proceeds to step S430 to delete the matching result of matching-OK, and executes processing from step S320 again.

When the user of the portable device 1 has opened and closed the vehicle doors 11-14 to get off the vehicle, even if the matching of ID code becomes OK at the open/close time, and the matching result is stored, the stored matching result and the position of the portable device 1 might not match because of the movement of the user of the portable device 1. For example, when the user of portable device 1 has moved away from the areas CA2*a*-CA2*e* available to mutual communication with the external transmitters 2*a*-2*d* or the internal transmitter 2*e* in the vehicle unit 100, it becomes improper to continue to store the matching result indicating that the matching is OK. Therefore, each time the first predetermined time T1 expires, the matching ECU 4 deletes the storage of the matching result of matching-OK, and again, performs external matching and internal matching. By doing so, the matching result can be updated to match the movement of the user of the portable device 1, that is, changes of the position of the portable device 1.

When the doors are opened and closed, since the portable device 1 is in the neighborhood of the vehicle, a response signal is returned in response to request signals from both the external transmitters 2*a*-2*d* and the internal transmitter 2*e*. A matching result of OK may be obtained for any of external matching and internal matching. In this case, since the user of the portable device 1 may subsequently get in or get off the vehicle compartment, the processing returns to step S320 to try external matching and internal matching again.

On the other hand, when it is determined at step S400 that the matching result of matching-OK for only one of external matching and internal matching is stored, the processing proceeds to regular matching check processing of step S410. The regular matching check processing is performed as shown in FIG. 7.

In this regular matching check processing, when the matching result of matching-OK for external matching is stored, the external matching is repeatedly performed. When the matching result of matching-OK for internal matching is stored, the internal matching is repeatedly performed. When the matching result of matching-OK for only one of external matching and internal matching is stored, the user of the portable device 1 is regarded as being in either of the inside and the outside of the vehicle. Therefore, only in an area that the user of portable device 1 is regarded as being in, mutual communication with the portable device 1 is tried to update the matching result regularly (periodically).

Figure 7:
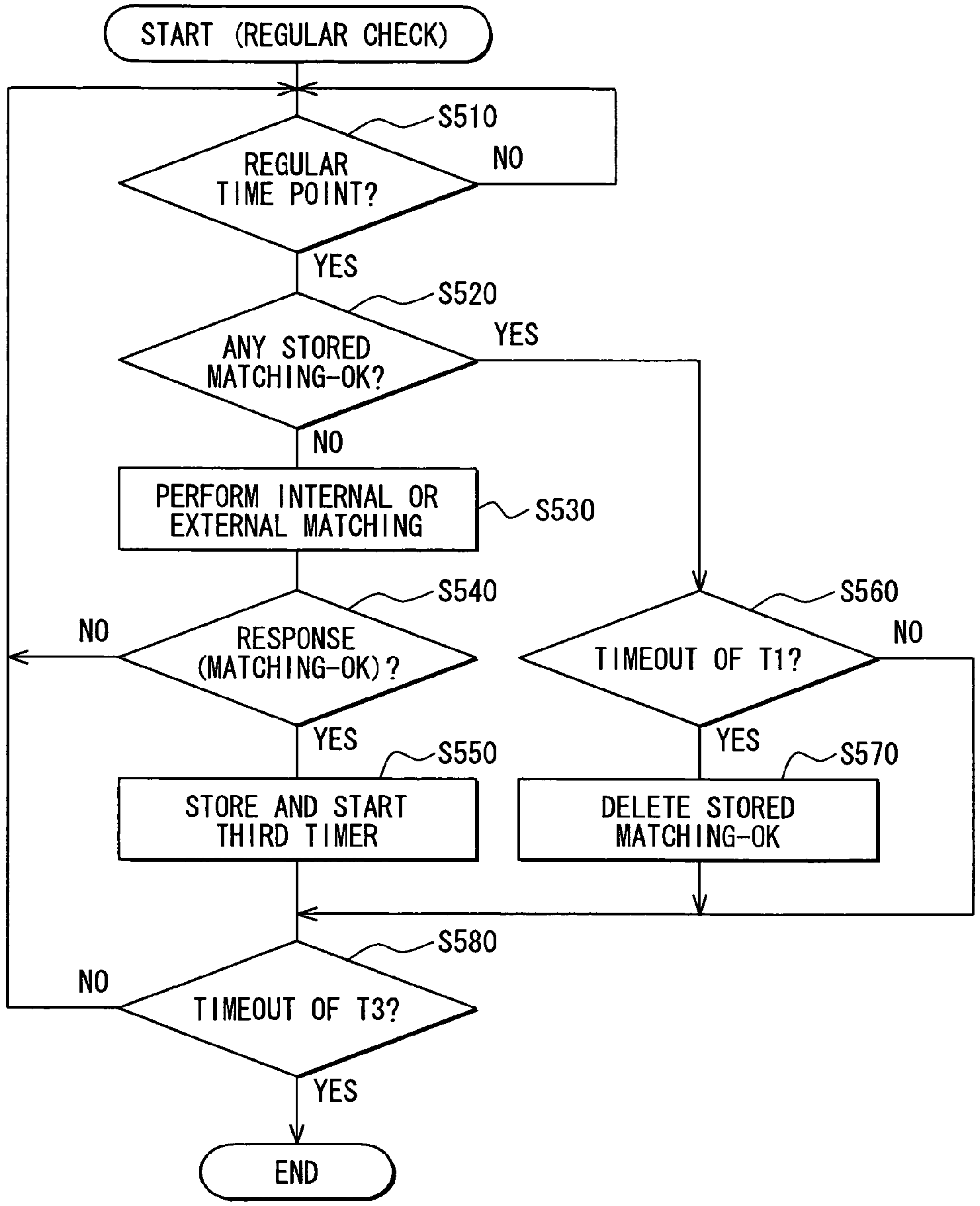
FIG. 7 is a flowchart showing regular matching processing in door open/close time mutual communication processing of the second embodiment.

In FIG. 7, step S510 determines a regular time point in which regular matching check processing is performed. Specifically, when a second predetermined time T2 has elapsed from a previous regular time point, it is determined that a regular time point has arrived. The second predetermined time T2 is set shorter than the first predetermined time T1, which is a storage time of the above matching result.

When the regular time point is determined at step S510, the processing proceeds to step S520. Step S520 determines whether the matching result of matching-OK for external matching or internal matching is stored. When it is determined in the determination processing that the matching result of matching-OK is stored, the processing proceeds to step S560.

Step S560, like step S420 in FIG. 6, determines a time (first predetermined time) T1 to store the matching result of matching-OK has expired. When it is determined at step S560 that the first predetermined time T1 has expired, the processing proceeds to step S570 to delete the matching result of matching-OK, and proceeds to processing of step S580. On the other hand, when it is determined that the first predetermined time T1 has not expired, the processing proceeds to step S580 without executing processing of step S570.

When the matching result has been deleted in processing of step S570, it is determined at step S520 that the matching result of matching-OK is not stored. In this case, processing of step S530 is executed. Step S530 executes external matching or internal matching for which the result of matching-OK was obtained previously. Specifically, to execute the external matching, request signals are transmitted from the external transmitters 2*a*-2*d*, while, to execute the internal matching, a request signal is transmitted from the internal transmitter 2*e*.

Step S540 receives a response signal from the portable device 1 in response to the request signals transmitted at step 530, and determines whether a matching result of ID code matching is OK. When YES is determined at step S540, the processing proceeds to step S550. When NO is determined, the processing returns to step S510. Step S550 stores a matching result indicating matching-OK, and starts to count elapsed time from the storing by a third counter.

Therefore, when it is determined at step S540 that a response signal indicating matching-OK is not received, and a matching result indicating matching-OK is not stored, each time the second predetermined time T2 elapses, request signals are transmitted from the external transmitters 2*a*-2*d* or the internal transmitter 2*e*. When the matching of ID code becomes OK, based on the response signal responding to the request signals, a matching result indicating matching-OK is newly stored.

Therefore, using the movement of the user of the portable device 1 after the user of the portable device 1 gets off or gets on the vehicle by opening or closing the vehicle doors 11-14, the possibility of obtaining a matching result that matching becomes OK can be increased. Specifically, since the user of the portable device 1 moves as time passes, the position of the portable device 1 also changes. If a matching result indicating matching-OK is not obtained, every second predetermined time being a relatively short cycle, request signals are repeatedly transmitted from the external transmitters 2*a*-2*d* or the internal transmitter 2*e*. As a result, mutual communication can be performed between the vehicle unit 100 and the portable device 1 by accurately capturing time point in which the position of portable device 1 exits from the dead zone area.

Step S580 determines whether elapsed time from when the vehicle doors 11-14 were opened and closed, or matching time (third predetermined time T3) to perform regular matching processing has expired. When YES is determined in the determination processing, the processing ends. When NO is determined, the processing returns to the processing of step S510. The third predetermined time T3 is set longer than the first and the second predetermined times T1 and T2.

Hence, until the third predetermined time T3 elapses from when the vehicle doors 11 to 14 were opened and closed, to store a new matching result, the external transmitters 2*a*-2*d* or the internal transmitter 2*e* receive a command to transmit request signals. Immediately after the vehicle doors 11-14 are opened and closed, the user of the portable device 1 does not always operate the door lock switches 6*a*2-6*d*2 for commanding the lock of the vehicle doors 11-14, or operate the engine switch to start up the engine. On the other hand, when no time limitations are placed on the transmission of a request signal, the vehicle unit 100 will keep electric power consuming wastefully. Therefore, until the third predetermined time T3 elapses from when the vehicle doors 11 to 14 were opened and closed, by commanding the transmission of a request signal, the user of the portable device is given extra time to operate the door lock switches 6*a*2-6*d*2 and the engine switch, and the matching result is updated according to changes of the position of the portable device 1 in the while, so that power consumption can be reduced.

The above embodiments may be modified in various ways.

For example, in the above embodiment, when the vehicle doors 11-14 are opened and closed, storage contents on a matching result are deleted, and then a request signal is transmitted from the internal transmitter 2*e* and/or the external transmitters 2*a*-2*d* to execute the external matching and internal matching. When the matching result of matching-OK is obtained, the matching result may be stored. This prevents the vehicle doors from being erroneously locked or engine startup from being permitted, based on matching results stored previously.

The storage of a matching result may be deleted only when the door 11 of a driver seat is opened and closed. For example, when the driver holds the portable device 1, if a vehicle door adjacent to the driver seat is opened and closed previously and a matching result indicating that matching is OK is stored, even if other vehicle doors are subsequently opened and closed, the stored matching result must be carried by limiting the deletion of a matching result to when the door 11 of the driver seat is opened and closed, the matching result can be prevented from being erroneously deleted when other vehicle doors are opened and closed.

In the above embodiments, until the third predetermined time has elapsed from when the vehicle doors 11-14 are opened and closed, external matching and/or internal are performed. However, even before the third predetermined time has elapsed, external matching and/or internal should be preferably terminated when the vehicle doors 11-14 have been locked, or when the engine has been started up. This is because after the vehicle doors have been locked, or the engine has been started up, it is unnecessary to newly obtain a matching result, which is a condition for approving them.

What is claimed is:

1. An on-vehicle equipment control system for on-vehicle equipment, comprising:

a portable device that returns a response signal including an ID code in response to a request signal received thereby; and a vehicle unit that transmits the request signal from a vehicle for performing mutual communication with the portable device, receives the response signal of the portable device, matches the ID code included in the response signal with an ID code stored therein, and controls the on-vehicle equipment in response to matching-OK indicating that the ID codes are in a predetermined relation, wherein the vehicle unit comprises:

a receiver that receives the response signal from the portable device;

an external transmitter that transmits the request signal to an outside of a vehicle compartment;

a trigger switch that is provided in a vehicle door and commands automatic locking of the vehicle door; and a control unit that causes the external transmitter to transmit the request signal when the vehicle door is opened and closed, stores in a memory the matching-OK as a result of matching the response signal received from the portable device and the request signal of the external transmitter, and controls locking of the vehicle door when the trigger switch is operated, the control unit locking the vehicle door in response to an operation of the trigger switch without causing the external transmitter to transmit the request signal when the matching-OK is stored in the memory before the operation of the trigger switch, and locking the vehicle door after causing the external transmitter to transmit the request signal when no matching-OK is stored in the memory before the operation of the trigger switch and confirming newly the matching-OK;

wherein the control unit deletes a stored matching-OK when a first predetermined time has elapsed time from previous storing of the matching-OK, causes the external transmitter to transmit the request signal, and stores newly the matching-OK when matching of the ID codes is confirmed based on the response signal received newly; and wherein the control unit causes the external transmitter to transmit the request signal each time a second predetermined time elapses if no matching-OK is stored therein after the vehicle door is opened and closed, and stores the matching-OK based on the response signal to the request signal.

2. The on-vehicle equipment control system according to claim 1, wherein:

the control unit deletes a storage content of the memory regarding a matching result when the vehicle door is opened and closed, and then stores the matching-OK based on the response signal received from the portable device.

3. The on-vehicle equipment control system according to claim 2, wherein:

the control unit deletes the storage content of the memory only when a driver-side vehicle door is opened and closed.

4. The on-vehicle equipment control system according to claim 1, wherein the vehicle unit further comprises:

an internal transmitter that transmits the request signal in the vehicle compartment, the control unit causes the internal transmitter to transmit the request signal when the trigger switch is operated, and permits locking of the vehicle door when the response signal of the portable device fails to result in the matching-OK.

5. The on-vehicle equipment control system according to claim 1, wherein:

the control unit causes the external transmitter to transmit the request signal until a third predetermined time elapses after the vehicle door is opened and closed, so that the matching-OK is stored newly.

6. The on-vehicle equipment control system according to claim 5, wherein:

the control unit terminates causing the external transmitter to transmit the request signal when the vehicle door is locked even before the third predetermined time elapses.

7. The on-vehicle equipment control system according to claim 1, wherein the vehicle unit further comprises:

an internal transmitter that transmits a request signal in the vehicle compartment; and an alarm device that provides an alarm, wherein the control unit causes the external transmitter and the internal transmitter to transmit the request signals when the vehicle door is opened and closed, stores an external matching-OK and an internal matching-OK when the ID code in the response signal transmitted in response to the request signals of the external transmitter and the internal transmitter is in the predetermined relation, respectively, and wherein the control unit causes an issuance of the alarm to indicate that the portable device is neither inside nor outside the vehicle compartment, when neither the external matching-OK or internal matching-OK is stored although the request signals are transmitted from the external transmitter and the internal transmitter.

8. A method of operating on-vehicle equipment control system for on-vehicle equipment, the method comprising:

transmitting, via an external transmitter, a request signal from a vehicle to an outside of a vehicle compartment for performing mutual communication with a portable device;

receiving, via a receiver, a response signal including an ID code from the portable device;

matching the ID code included in the response signal with a stored ID code;

controlling the on-vehicle equipment in response to matching-OK indicating that the ID codes are in a predetermined relation;

commanding, via a trigger switch provided in a vehicle door, automatic locking of vehicle door;

wherein the controlling includes:

causing the external transmitter to transmit the request signal when the vehicle door is opened and closed, storing in a memory the matching-OK as a result of matching the response signal received from the portable device and the request signal of the external transmitter, and controlling locking of the vehicle door when the trigger switch is operated after the vehicle door is opened and closed;

locking the vehicle door in response to an operation of the trigger switch without causing the external transmitter to transmit the request signal when the matching-OK is stored in the memory before the trigger switch is operated, and locking the vehicle door after causing the external transmitter to transmit the request signal when no matching-OK is stored in the memory at the time of the operation of the trigger switch and confirming newly the matching-OK;

deleting stored matching-OK when a first predetermined time has elapsed from previous storing of the matching-OK, causing the external transmitter to transmit the request signal, and storing newly the matching-OK when matching of the ID codes is confirmed based on the response signal received newly; and causing the external transmitter to transmit the request signal each time a second predetermined time elapses if no matching-OK is stored therein after the vehicle door is opened and closed, and storing the matching-OK based on the response signal to the request signal.

9. The method according to claim 8, further comprising: deleting a storage content of the memory regarding a matching result when the vehicle door is opened and closed, and then storing the matching-OK based on the response signal received from the portable device.

10. The method according to claim 8, further comprising: transmitting, via an internal transmitter, a request signal in the vehicle compartment, causing the internal transmitter to transmit its request signal when the trigger switch is operated, and permitting locking of the vehicle door when the response signal of the portable device fails to result in the matching-OK.

11. The method according to claim 8, further comprising:

transmitting, via an internal transmitter, a request signal in the vehicle compartment; and providing an alarm via an alarm device;

wherein the controlling includes:

causing the external transmitter and the internal transmitter to transmit their request signals when the vehicle door is opened and closed, storing an external matching-OK and an internal matching-OK when the ID code in the response signal transmitted in response to the request signals of the external transmitter and the internal transmitter is in the predetermined relation, respectively, and causing an issuance of the alarm to indicate that the portable device is not inside and outside the vehicle compartment, when neither the external matching-OK or internal matching-OK is stored although the request signals are transmitted from the external transmitter and the internal transmitter.

12. The on-vehicle equipment control system according to claim 1, wherein the vehicle unit further comprises:

an internal transmitter that transmits the request signal in the vehicle compartment, the control unit causes the internal transmitter to transmit the request signal when the trigger switch is operated, and causes locking of the vehicle door when the response signal of the portable device fails to result in the matching-OK.

13. The method according to claim 8, further comprising:

transmitting, via an internal transmitter, a request signal in the vehicle compartment, causing the internal transmitter to transmit its request signal when the trigger switch is operated, and causing locking of the vehicle door when the response signal of the portable device fails to result in the matching-OK.

* * * * *